United States Patent [19]

Rine

[11] Patent Number: 4,625,427
[45] Date of Patent: Dec. 2, 1986

[54] APPARATUS FOR MEASURING THE ANGLE OF A HOLE IN A SURFACE

[76] Inventor: Paul A. Rine, 5071 Gunston Dr., Columbus, Ohio 43232

[21] Appl. No.: 800,690

[22] Filed: Nov. 22, 1985

[51] Int. Cl.$^4$ .............................. G01B 5/25
[52] U.S. Cl. ........................ 33/534; 33/509; 33/172 D
[58] Field of Search ............ 33/534, 509, 169 C, 33/172 D, 180 R, 533, 520, 538

[56] References Cited

U.S. PATENT DOCUMENTS

| | | | |
|---|---|---|---|
| 2,706,338 | 4/1955 | Ackerman et al. | 33/509 |
| 3,109,243 | 11/1963 | McCormick | 33/509 |
| 3,206,858 | 9/1965 | Bernard | 33/509 |
| 3,389,475 | 6/1968 | Sapelak | 33/509 |
| 3,392,453 | 7/1968 | Snoddy | 33/509 |
| 3,802,084 | 4/1974 | Fortado, Jr. | 33/172 D |
| 4,242,801 | 1/1981 | Ellison | 33/509 |

*Primary Examiner*—Willis Little
*Attorney, Agent, or Firm*—Sidney W. Millard

[57] ABSTRACT

The angle of a hole in a surface with respect to that surface is measured by a ball mounted between a pair of plates, which ball can be located adjacent the hole. A pointer extends through the ball and projects on both sides. One end of the pointer extends into the hole and the other extends to within close proximity of a transparent dome. The angularity of the hole is then read from the pointer adjacent the dome, which pointer will indicate the angularity from indicia on the dome.

11 Claims, 2 Drawing Figures

APPARATUS FOR MEASURING THE ANGLE OF A HOLE IN A SURFACE

FIELD OF THE INVENTION

The apparatus of this invention relates to measuring the angle of the center line of a hole in a surface.

BACKGROUND OF THE INVENTION

During the manufacture of products where metal surfaces provide a base, hand drilled holes are often drilled for purposes of providing an opening for screws which will threaded into the hole and secure another element to that metal surface. There is no reason this is not also true of wooden substrates, but this invention is primarily concerned with solving a problem in the aircraft industry where hand drilled holes sometimes not perpendicular to the surface in which they are drilled. There is a certain degree of latitude in the angularity which is functionally adequate, but eyeball observation of a hole will not necessarily tell the operator whether the angle is sufficiently small as to be acceptable under the circumstances.

After having designed the apparatus illustrated in the drawings, a review of the prior art in the Patent Office was conducted and four patents of interest were discovered, U.S. Pat. Nos. 3,389,475, 2,706,338, 3,109,243, 3,392,453. These references which appear to be the most pertinent are all directed to measuring the angularity of holes drilled in bowling balls and while they relate generally to the subject matter under consideration, each of them includes a plurality of moving parts which can go wrong and which serve only to complicate what is in fact a simple procedure.

SUMMARY OF THE INVENTION

The invention involved herein relates to measuring the angularity of a hole drilled in a substrate with respect to the surface of the substrate and what it does different from the prior apparatus known to the industry is that there is only one moving part.

That moving part is a spherical ball having a pointer piercing its center point and forming a diameter projecting beyond the periphery of the ball on each side. The ball itself is suspended above the surface of the substrate and adjacent the hole formed in said substrate. The ball is suspended by being bolted between a pair of plates which allows the ball to rotate, but not otherwise move relative to said plates. Concentric apertures are formed in the two plates, and each plate has a surface in that opening which conforms to the surface of the ball and each conforming surface has a diameter less than the diameter of the ball and a diameter which is at least equal to the diameter of the ball.

A transparent dome is mounted above the ball on the upper plate and concentric circles are formed on the dome. The axis of the concentric circles is coaxial with the openings through the plates, intersects the center point of the ball and is perpendicular to the surface in which the hole is formed.

The concentric circles are calibrated based on the length of the pointer from the center point of the ball such that they indicate 5° for each circle from the center point of the dome.

A pair of lines meet at the center line of the dome and extend radially thereof while conforming to the curvature of the dome. The two lines are normal to each other at the center point of the dome.

On the upper plate are formed indicia to show angular relationships and the indicia are formed in a circle around the dome, but separate and apart from the dome. The dome is held to the upper plate by means which allows it to rotate with respect to said plate about an axis coextensive with the axis of the concentric circles.

Objects of the invention which are not clear will be understood more fully by an observation of the appended drawings and the detailed description of the preferred embodiment which follow.

DESCRIPTION OF THE PREFERRED EMBODIMENT

Figure 2:
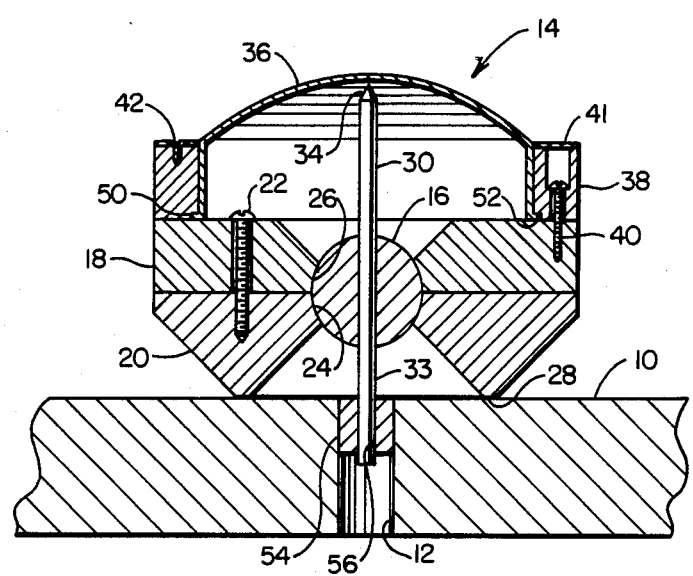
FIG. 2 is a sectional view taken along line 2—2 of FIG. 1.

Looking first to FIG. 2, a substrate 10 has a hole 12 formed therein by drilling or any other means. The way the hole is formed is immaterial to this invention which is designed to determine the angularity of the axis of the hole 12 with respect to the surface of the substrate 10.

The apparatus generally indicated at 14 measures the angularity of the hole with respect to a zero point which is 90° from the plane of the surface of substrate 10, and the reason for this is that under ordinary circumstances one wishes to have a hole drilled in the surface which is perpendicular to that surface.

The apparatus has only one moving part which is a spherical ball 16 mounted for rotation between an upper plate 18 and a lower plate 20. The plates are held in position by screw means 22, only one screw 22 being shown in the drawing for illustrative purposes. The ball is held in position between the two plates by conforming surfaces 24 and 26 which form a part of a coaxially aligned opening in each plate.

As will be clear, in order to hold the ball in place the coaxial openings in the two plates must each include a diameter which is smaller than the ball and one which is at least equal to the ball. Clamping the two plates together allows the shorter diameter in each plate to serve as a barrier flange for the ball and prevent it from moving longitudinally of the plates. The two larger diameters in the conforming coaxial surfaces allow the conforming surfaces to fit over the ball and engage the other plates at the largest diameter point.

The lower plate 20 includes mounting feet 28 which may be a plurality of points or an angular ring, the only thing the feet are to do is to orient the apparatus 14 such that a hole 12 drilled at 90° with respect to the surface of the substrate 10 would cause the pointer 30 which bisects the ball 16 to point to a zero angle 32 (see FIG. 1) when the feet are in contact with the substrate and the pointer 30 is aligned coaxially with the axis of the hole 12.

The pointer 30 extends through the center point of the ball 16 and extends a specifically desired distance beyond the surface of the ball 15. One end 33 must be long enough to extend into the hole 12 and below the feet 28 to allow the desired measurement. The other end extends upward above the upper plate 18 and includes a point 34.

A transparent plastic dome 36 is rotably mounted on the upper plate by a ring 38 which is secured to plate 18 by screw means 40. A plurality of screws 40 will be used under ordinary conditions, but only one is illustrated in FIG. 2.

After the tightening of screws 40, a calibration plate 41 will be assembled on the top surface of ring 38. Plate 41 will be held rigidly in place by screws 42.

The dome 36 includes a plurality of concentric circles 44 drawn on the surface of the dome, and each circle is calibrated with respect to the distance between the center point of ball 16 and the dome's radial distance from that point such that the circles each indicate an angle of 5°. That is, where point 34 indicates two circles from the center point 32, the axis of the hole 12 will be 10° from a line perpendicular to surface of substrate 10. It is clear that the circles could be drawn to indicate an angle of 10° or 2° or whatever the user needs. The exact number of degrees between circles is not critical.

Figure 1:
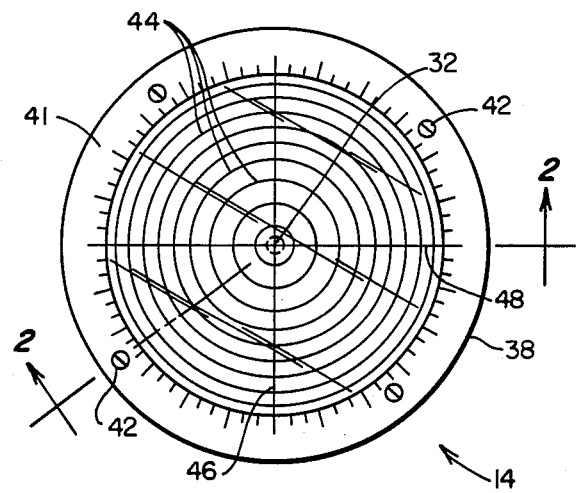
FIG. 1 is a top plan view of the angle measuring apparatus of this invention.

A pair of radially extending lines 46 and 48 are drawn on the surface of the dome 36 and in FIG. 1 they are shown as being perpendicular to each other and passing through the zero point 32 which is coextensive with the axis of the concentric circles. The reason for the radially extending lines 46 and 48 is to allow one to orient the direction of the angle should it be necessary. With this in mind, angular indicia are formed on the upper surface of the calibration plate 41 and the dome is affixed to the upper plate 18 by means which allows the dome to rotate with respect to the plates. The usefulness of this rotation is obvious.

The way the dome is mounted is to have a radially extending flange 50 adjacent its lower end, which flange 50 extends into a groove 52 formed in the surface of the ring. Thus when the screws 40 clamp the ring 38 tightly against plate 18, the groove allows rotational movement of the dome 36 for the purpose indicated.

In operation, a hand drilled hole will be formed and the apparatus 14 will be used to measure its angle. As a part of the apparatus, a ferrule 54 will be mounted on end 33 and then it will slide into hole 12. This will allow the hole angularity to be measured. Indeed with the apparatus involved herein a plurality of ferrules of different diameters will be in the kit associated with the apparatus 14. A ferrule 54 will be provided for each of the conventional sizes of holes to be drilled. An opening 56 is formed along the center line of each ferrule 54 of a size conforming to the downward projection 33 of the pointer 30. Thereby the opening 56 will be coaxial with the hole and the pointer will also be coaxial with the hole because it extends coaxial with the aperture 56. So, the ferrule will be mounted on the lower end 33 of the pointer 30 and the ferrule inserted into the hole. Then the operator will simply read the angularity, if any, both as to deflection and orientation if desired. This will allow the operator to determine whether the hole is of a usable nature or whether it must be plugged and another hole drilled.

Having thus described the invention in its preferred embodiment it will be clear that modifications may be made without departing from the spirit of the invention. Accordingly it is not intended that the invention be limited by the language used to describe it in the specification nor by the drawings themselves, rather it is intended that the invention be limited only by the scope of the appended claims.

I claim:

1. Apparatus for measuring the angle of the centerline of a circular hole of uniform diameter with respect to the surface surrounding the hole, said apparatus comprising:

a spherical ball having a diameter and a center point, said ball being supported between an upper and a lower plate, each plate having an opening therethrough, said plate openings being coaxial, said plates each having a surface in said opening conforming to the surface of the ball, the conforming surface in each opening having means having one diameter less than said ball diameter and another diameter at least as great as said ball diameter, said plates being in contact with each other and in contact with said ball for preventing all movement of said ball with respect to said plates except for rotation of said ball, a linear pointer extending through the ball having a sharp point on its upper end, the pointer extending through the center point of the ball, a ferrule mounted on the lower end of said pointer, said ferrule being cylindrical and of the same diameter as the hole, the pointer being inserted into an aperture in said ferrule, the aperture being coaxial with the axis of the cylindrical ferrule, the lower plate having a contact surface for engaging the surface surrounding said hole, a semi-spherical transparent dome mounted above said upper plate, the inner surface of said dome being in close proximity to the point on said pointer, the inner surface of said dome having a radius slightly greater than the distance from the center point of the ball to the tip of the point of the pointer, and the dome including lines forming concentric circles about an axis whereby an observer may observe the point of the pointer through the transparent dome and its location with respect to the axis of the circles, the axis of the circles being perpendicular to the contact surface of the lower plate.

2. The apparatus of claim 1 wherein the dome includes two straight lines extending orthogonally of each other and each passing through the axis of the concentric circles.

3. The apparatus of claim 2 wherein the dome is secured to said upper plate by means for allowing the dome to rotate with respect to said upper plate about the axis of the concentric circles.

4. The apparatus of claim 3 including indicia mounted on the upper plate in a circle around the dome, the dome being rotable with respect to said indicia.

5. The apparatus of claim 4 wherein the dome is secured to said upper plate by a ring secured to said upper plate, the dome including a radially extending flange, the flange extending into a groove formed in the surface of the ring.

6. The apparatus of claim 1 wherein the dome is secured to said upper plate by means for allowing the dome to rotate with respect to said upper plate about the axis of the concentric circles.

7. The apparatus of claim 6 including indicia mounted on the upper plate in a circle around the dome, the dome being rotable with respect to said indicia.

8. The apparatus of claim 7 wherein the dome is secured to said upper plate by a ring secured to said upper plate, the dome including a radially extending flange, the flange extending into a groove formed in the surface of the ring.

9. The apparatus of claim 1 including indicia mounted on the upper plate in a circle around the dome, the dome being rotable with respect to said indicia.

10. The apparatus of claim 9 wherein the dome is secured to said upper plate by a ring secured to said upper plate, the dome including a radially extending flange, the flange extending into a groove formed in the surface of the ring.

11. The apparatus of claim 1 wherein the dome is secured to said upper plate by a ring secured to said upper plate, the dome including a radially extending flange, the flange extending into a groove formed in the surface of the ring.

* * * * *